(12) United States Patent
Snyder et al.

(10) Patent No.: US 10,260,748 B2
(45) Date of Patent: Apr. 16, 2019

(54) GAS TURBINE ENGINE COMBUSTOR WITH TAILORED TEMPERATURE PROFILE

(71) Applicant: United Technologies Corporation, Hartford, CT (US)

(72) Inventors: Timothy S. Snyder, Glastonbury, CT (US); Randal G. McKinney, Ellington, CT (US); James B. Hoke, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 1852 days.

(21) Appl. No.: 13/725,137

(22) Filed: Dec. 21, 2012

(65) Prior Publication Data

US 2014/0338351 A1 Nov. 20, 2014

(51) Int. Cl.
| | | |
|---|---|---|
| *F23R 3/00* | (2006.01) | |
| *F23R 3/12* | (2006.01) | |
| *F02C 7/236* | (2006.01) | |
| *F23R 3/28* | (2006.01) | |
| *F23R 3/26* | (2006.01) | |
| *F23R 3/06* | (2006.01) | |

(52) U.S. Cl.
CPC ............ *F23R 3/002* (2013.01); *F02C 7/2365* (2013.01); *F23R 3/06* (2013.01); *F23R 3/12* (2013.01); *F23R 3/26* (2013.01); *F23R 3/286* (2013.01); *Y02T 50/675* (2013.01)

(58) Field of Classification Search
CPC .... F23R 3/12; F23R 3/14; F23R 3/286; F23R 3/04; F23R 3/26; F23R 3/002
See application file for complete search history.

(56) References Cited

U.S. PATENT DOCUMENTS

| | | |
|---|---|---|
| 5,257,502 A | 11/1993 | Napoli |
| 5,261,222 A | 11/1993 | Napoli |
| 5,279,127 A * | 1/1994 | Napoli ............................ 60/754 |
| 5,930,999 A | 8/1999 | Howell et al. |
| 6,260,359 B1 | 7/2001 | Monty et al. |
| 6,279,323 B1 | 8/2001 | Monty et al. |
| 6,550,251 B1 | 4/2003 | Stickles et al. |
| 6,708,498 B2 | 3/2004 | Stickles et al. |
| 6,725,667 B2 | 4/2004 | Farmer et al. |
| 6,834,505 B2 | 12/2004 | Al-Roub et al. |
| 6,986,253 B2 | 1/2006 | Leen et al. |
| 7,013,649 B2 | 3/2006 | Monty |
| 7,155,913 B2 | 1/2007 | Beule et al. |
| 7,185,497 B2 | 3/2007 | Dudebout et al. |
| 7,308,794 B2 | 12/2007 | Morenko et al. |
| 7,310,952 B2 | 12/2007 | Howell et al. |
| 7,316,117 B2 | 1/2008 | Ohri |
| 7,325,403 B2 | 2/2008 | Currin et al. |
| 7,363,756 B2 | 4/2008 | Carrea et al. |

(Continued)

OTHER PUBLICATIONS

International search report for PCT/US2013/077091 dated Apr. 18, 2014.
EP search report for EP13864137.8 dated Feb. 10, 2016.

*Primary Examiner* — Ehud Gartenberg
*Assistant Examiner* — Thomas Burke
(74) *Attorney, Agent, or Firm* — O'Shea Getz P.C.

(57) ABSTRACT

A method of tailoring a combustor flow for a gas turbine engine includes controlling an airflow into a swirler to be generally uniform and controlling an airflow into a quench zone to provide a desired pattern factor.

1 Claim, 14 Drawing Sheets

(56) References Cited

U.S. PATENT DOCUMENTS

| | | |
|---|---|---|
| 7,386,980 B2 | 6/2008 | Green et al. |
| 7,421,843 B2 | 9/2008 | Laster et al. |
| 7,464,553 B2 | 12/2008 | Hsien et al. |
| 7,513,098 B2 | 4/2009 | Ohri et al. |
| 7,523,603 B2 | 4/2009 | Hagen et al. |
| 7,721,437 B2 | 5/2010 | Howell et al. |
| 8,096,132 B2 | 1/2012 | Huang et al. |
| 8,156,744 B2 | 4/2012 | Hernandez et al. |
| 8,196,288 B2 | 6/2012 | Wagner et al. |
| 8,281,597 B2 | 10/2012 | Li et al. |
| 10,077,903 B2 * | 9/2018 | Tu .............................. F23R 3/06 |
| 2003/0177769 A1 * | 9/2003 | Graves et al. ................... 60/752 |
| 2005/0081526 A1 * | 4/2005 | Howell ................... F23R 3/002 |
| | | 60/748 |
| 2006/0196188 A1 * | 9/2006 | Burd et al. ...................... 60/754 |
| 2006/0272335 A1 * | 12/2006 | Schumacher et al. .......... 60/804 |
| 2008/0127651 A1 | 6/2008 | Zupanc et al. |
| 2008/0155988 A1 * | 7/2008 | Commaret et al. ............. 60/755 |
| 2009/0084110 A1 | 4/2009 | Dudebout et al. |
| 2010/0218503 A1 | 9/2010 | Bronson et al. |
| 2011/0048024 A1 | 3/2011 | Snyder et al. |
| 2012/0186264 A1 | 7/2012 | Hoke |

\* cited by examiner

GAS TURBINE ENGINE COMBUSTOR WITH TAILORED TEMPERATURE PROFILE

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section for burning a hydrocarbon fuel in the presence of the pressurized air, and a turbine section to extract energy from the resultant combustion gases.

High fuel-air ratio combustors generate high thermal loads for prolonged time periods that may challenge turbine section durability. The thermal loads may also be non-uniform in some locations such that the turbine section service life and/or thrust generation may be at least partially compromised through combustor section restrictions.

SUMMARY

A method of tailoring a combustor flow for a gas turbine engine according to one disclosed non-limiting embodiment of the present disclosure includes controlling an airflow into a swirler, and controlling an airflow into a quench zone to provide a desired pattern factor.

In a further embodiment of the foregoing embodiment, the method includes controlling the airflow into the swirler to be generally uniform.

In a further embodiment of any of the foregoing embodiments, the method includes controlling a fuel-air mixture to be generally uniform downstream of the swirler.

In a further embodiment of any of the foregoing embodiments, the method includes controlling the airflow into the swirler to increase fuel uniformity.

In a further embodiment of any of the foregoing embodiments, the method includes trimming the airflow into the quench zone to achieve a desired radial profile. In the alternative or additionally thereto, the foregoing embodiment includes controlling the airflow into the quench zone to reduce said desired radial profile in a 5%-25% span region.

In a further embodiment of any of the foregoing embodiments, the method includes controlling the airflow into the quench zone with a multiple of trim holes downstream of a quench hole.

A method of tailoring a combustor flow for a gas turbine engine, according to another disclosed non-limiting embodiment of the present disclosure includes controlling interaction of a fuel-air mixture from a swirler with an airflow into a quench zone.

In a further embodiment of the foregoing embodiment, the method includes controlling the swirler interaction with a quench zone to increase fuel uniformity.

In a further embodiment of any of the foregoing embodiments, the method includes uniformly distributing airflow to the swirler.

In a further embodiment of any of the foregoing embodiments, the method includes trimming an airflow into the quench zone.

In a further embodiment of any of the foregoing embodiments, the method includes providing a pattern factor below approximately 0.3.

In a further embodiment of any of the foregoing embodiments, the method includes providing a profile factor below approximately 0.12.

A combustor of a gas turbine engine according to another disclosed non-limiting embodiment of the present disclosure includes a liner assembly with a quench hole and a multiple of trim holes downstream thereof.

In a further embodiment of the foregoing embodiment, the multiple of trim holes are circumferentially offset from said quench hole.

In a further embodiment of any of the foregoing embodiments, the multiple of trim holes are axially aligned with a quench hole in an opposed liner assembly. In the alternative or additionally thereto, in the foregoing embodiment the opposed liner assembly is an outer liner assembly. In the alternative or additionally thereto, in the foregoing embodiment the multiple of trim holes includes three trim holes.

In a further embodiment of any of the foregoing embodiments, the combustor includes a bulkhead assembly transverse to said liner assembly, a swirler mounted to said bulkhead assembly said swirler without tabs.

In a further embodiment of any of the foregoing embodiments, the combustor includes a bulkhead assembly transverse to said liner assembly, a swirler mounted to said bulkhead assembly said swirler circular in shape.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
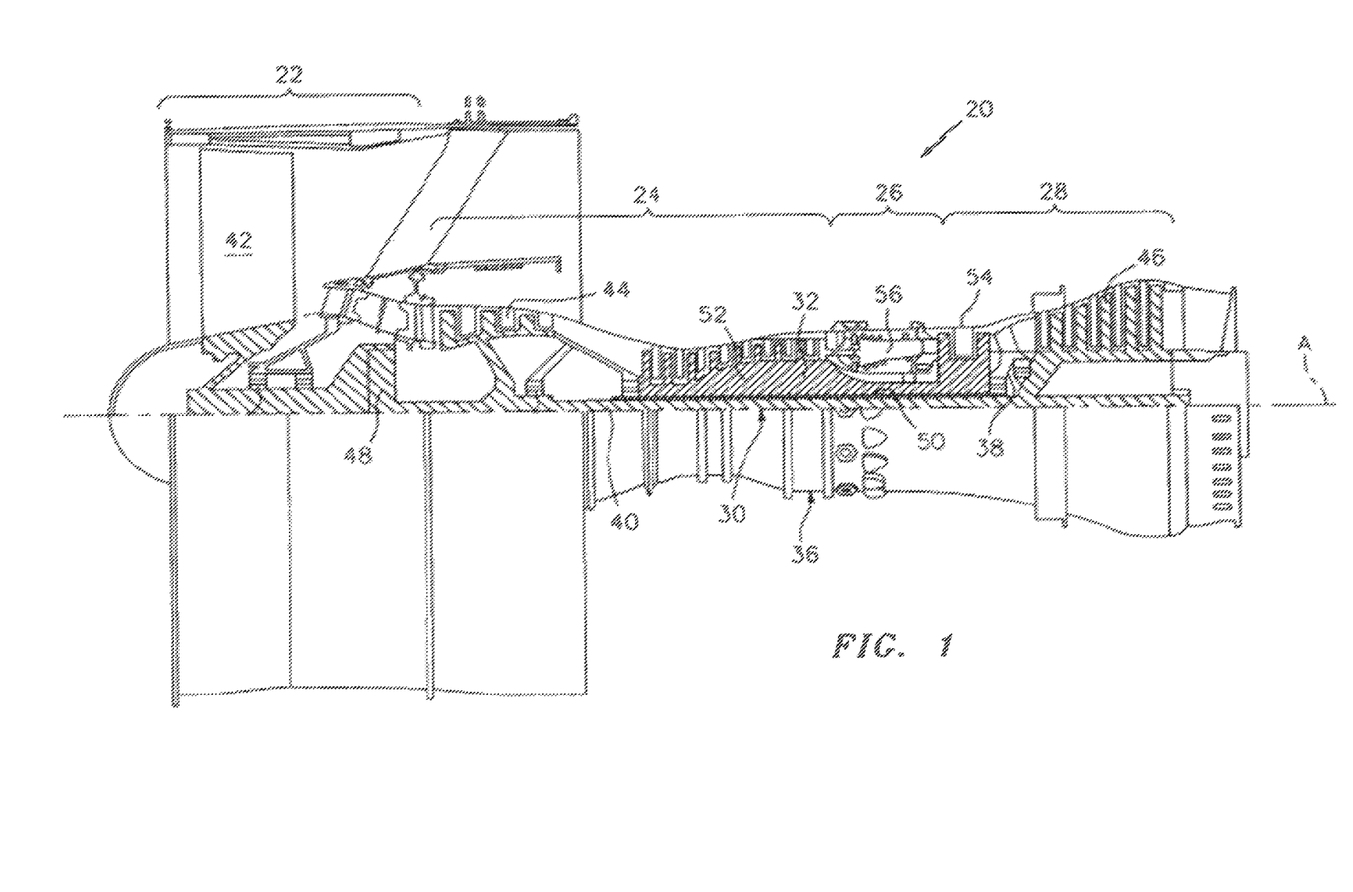
FIG. 1 is a schematic cross-section of an example gas turbine engine architecture.
Figure 2:
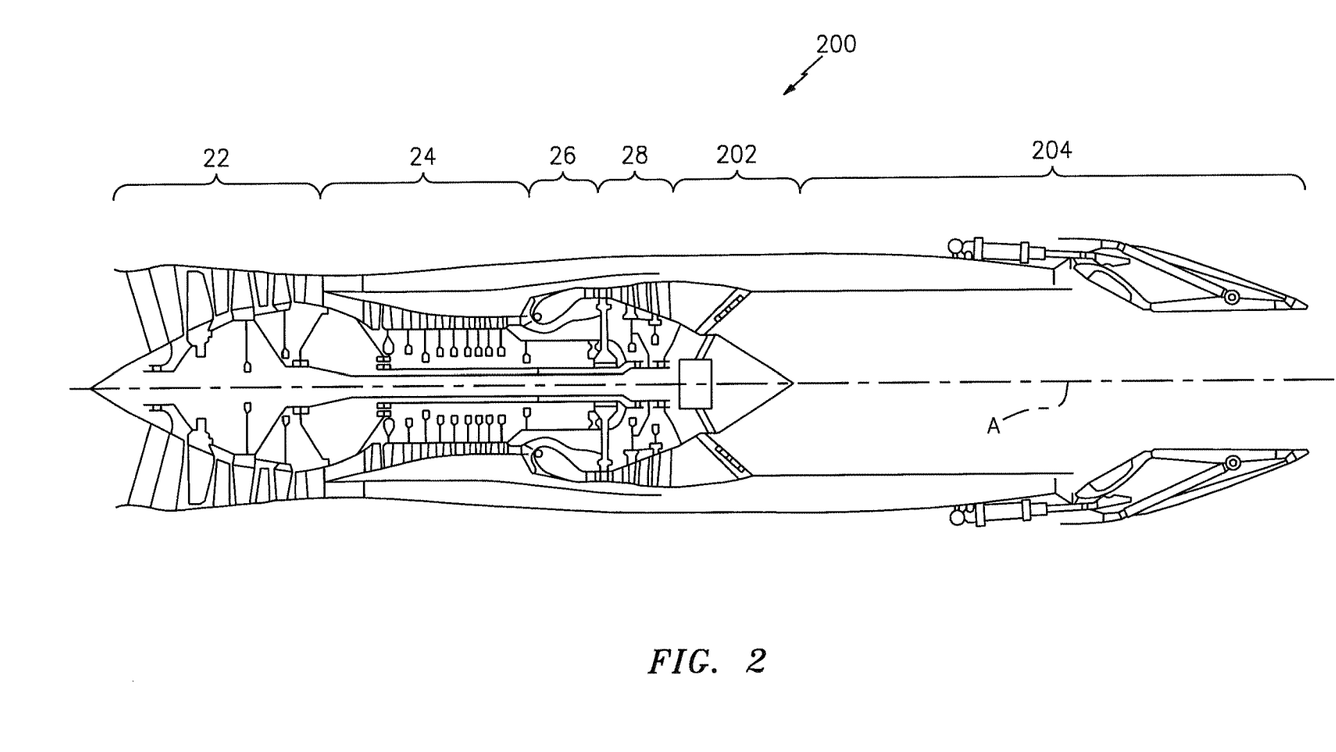
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section 202 and exhaust duct section 204 (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a low bypass augmented turbofan (FIG. 2), turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by bearing structures 38 within the static structure 36. It should be understood that various bearing structures 38 at various locations may alternatively or additionally be provided.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $("T"/518.7)^{0.5}$ in which "T" represents the ambient temperature in degrees Rankine. The Low Corrected Fan Tip Speed according to one non-limiting embodiment of the example gas turbine engine 20 is less than about 1150 fps (351 m/s).

Figure 3:
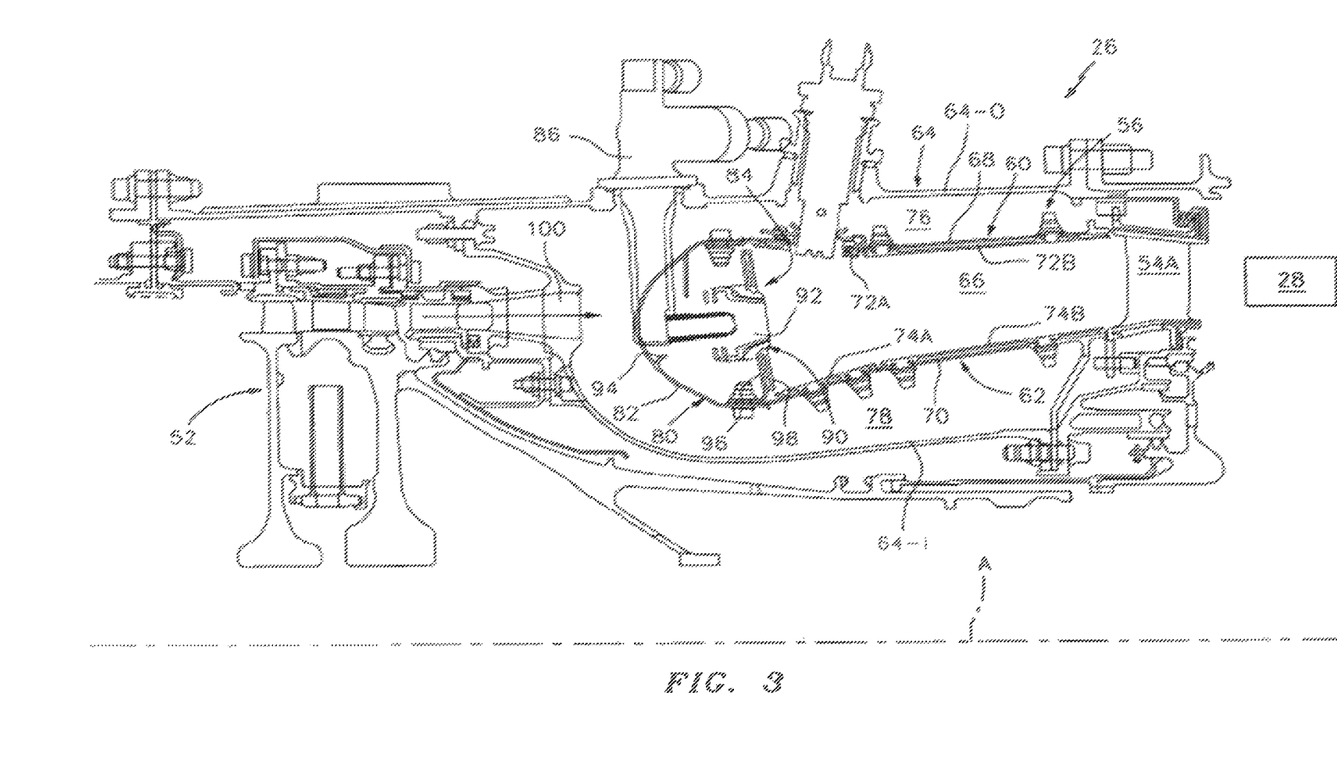
FIG. 3 is an expanded longitudinal schematic sectional view of a combustor section according to one non-limiting embodiment that may be used with the gas turbine engine shown in FIGS. 1 and 2.

With reference to FIG. 3, the combustor 56 generally includes an outer combustor liner assembly 60, an inner combustor liner assembly 62 and a diffuser case module 64. The outer combustor liner assembly 60 and the inner combustor liner assembly 62 are spaced apart such that a combustion chamber 66 is defined therebetween. The combustion chamber 66 may be generally annular in shape.

The outer combustor liner assembly 60 is spaced radially inward from an outer diffuser case 64-O of the diffuser case module 64 to define an outer annular plenum 76. The inner combustor liner assembly 62 is spaced radially outward from an inner diffuser case 64-I of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Figure 4:
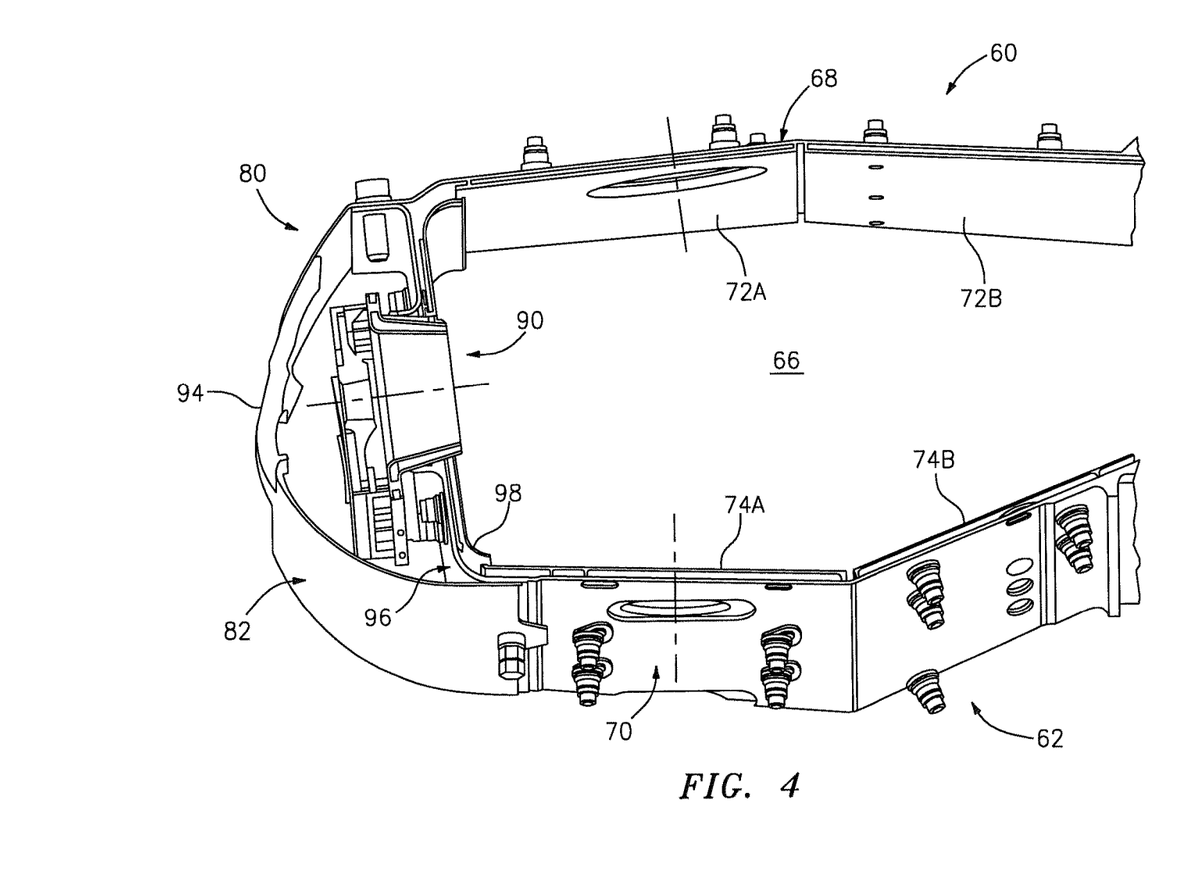
FIG. 4 is an expanded perspective partial sectional view of a combustor sector.

The combustor liner assemblies 60, 62 contain the combustion products for direction toward the turbine section 28. Each combustor liner assembly 60, 62 generally includes a respective support shell 68, 70 which supports one or more heat shields 72, 74 mounted to a hot side of the respective support shell 68, 70. Each of the heat shields 72, 74 may be generally rectilinear and manufactured of, for example, a nickel based super alloy, ceramic or other temperature resistant material and are arranged to form a liner array. In one disclosed non-limiting embodiment, the liner array includes a multiple of forward heat shields 72A and a multiple of aft heat shields 72B that are circumferentially staggered to line the hot side of the outer shell 68 (also shown in FIG. 4). A multiple of forward heat shields 74A and a multiple of aft heat shields 74B are circumferentially staggered to line the hot side of the inner shell 70 (also shown in FIG. 4). It should be appreciated that other combustor liner assemblies 60, 62 such as single wall liners will also benefit herefrom.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of swirlers 90 (one shown). Each of the swirlers 90 is circumferentially aligned with one of the annular hood ports 94 to project through the bulkhead assembly 84. Each bulkhead assembly 84 generally includes a bulkhead support shell 96 secured to the combustor liner assembly 60, 62, and a multiple of circumferentially distributed bulkhead heat shields 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct the combustion gases onto the turbine blades of the first turbine rotor in the turbine section 28 to facilitate the conversion of pressure energy into kinetic energy. The combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 5:
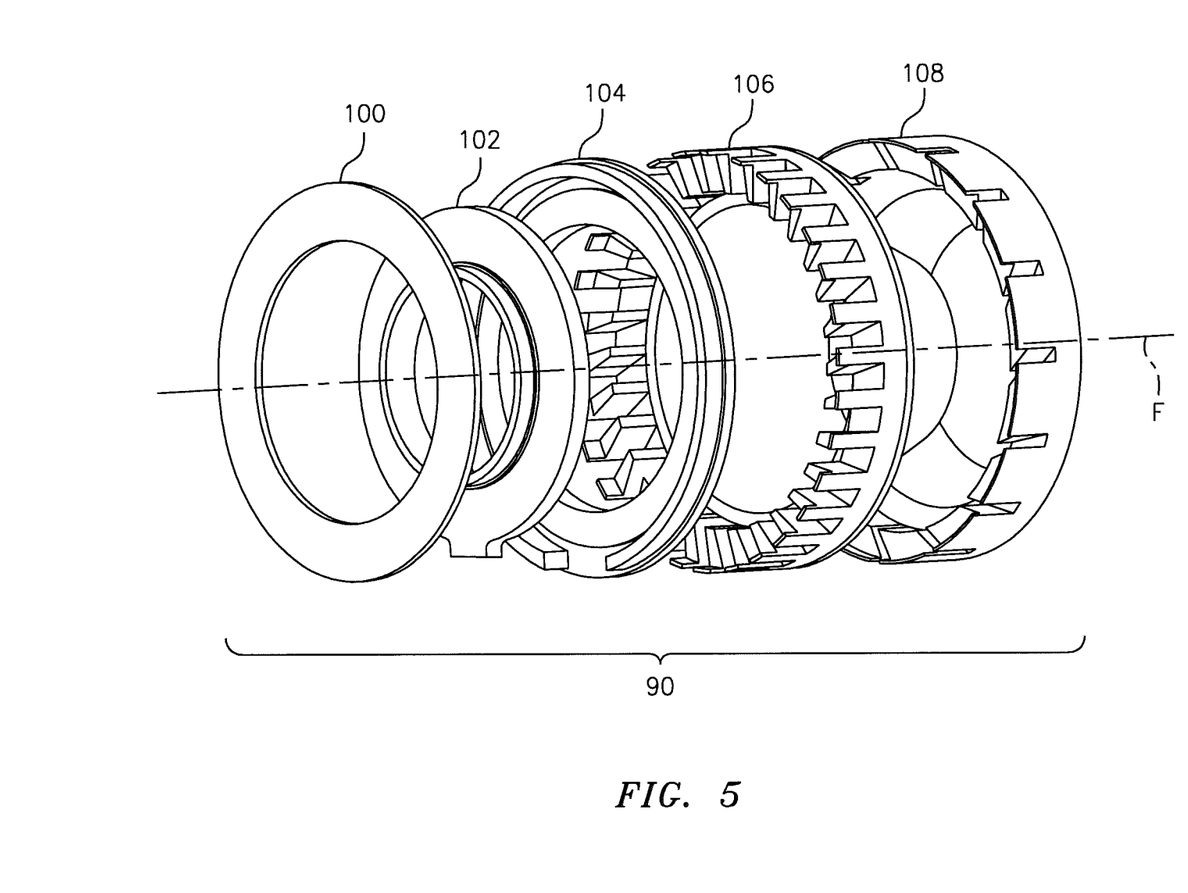
FIG. 5 is an exploded view of a swirler.

With reference to FIG. 5, each swirler 90 generally includes a capture plate 100, a nozzle guide 102, a guide housing 104, a first swirler body 106 and a second swirler body 108. The capture plate 100 is mounted to the guide housing 104 to retain the nozzle guide 102, the nozzle guide 102 movable with respect to the guide housing 104. It should be appreciated that alternative or additional components may be utilized herewith and that the two part swirler body shown is merely but one example assembly.

Figure 6:
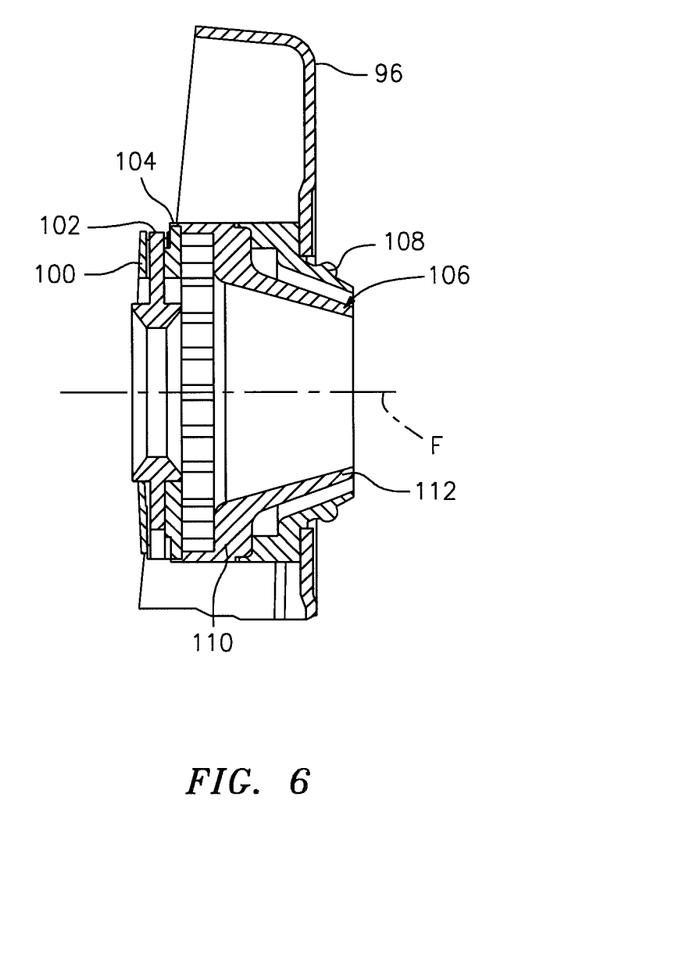
FIG. 6 is a cross-sectional view of the swirler of FIG. 5.

With reference to FIG. 6, the first swirler body 106 generally includes a base section 110 and a frustroconical section 112 that extends downstream of the base section 110. The base section 110 includes a multiple of passages 114 generally radial with respect to the swirler centerline F to receive and direct primary combustion core airflow from within the hood 82 to generate a fuel-air mixture. It should be appreciated that generally radial as defined herein is transverse to said centerline F but inclusive of a tangential component to impart a swirl to the primary combustion core airflow about the centerline F.

An outer periphery of the swirler 90 is circular so as to provide a uniform periphery and thereby a uniform airflow into the swirler 90. The swirler may be brazed or otherwise attached to the bulkhead support shell 96 to maintain the uniform periphery.

Figure 7:
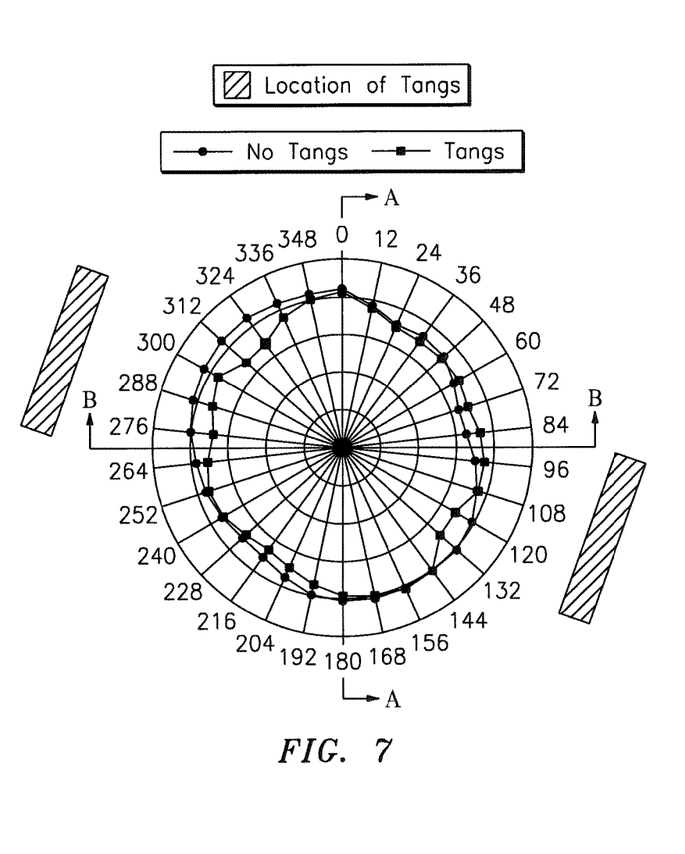
FIG. 7 is a plot of swirler passage flow between the swirler of FIG. 5 and a conventional tanged swirler.
Figure 8:
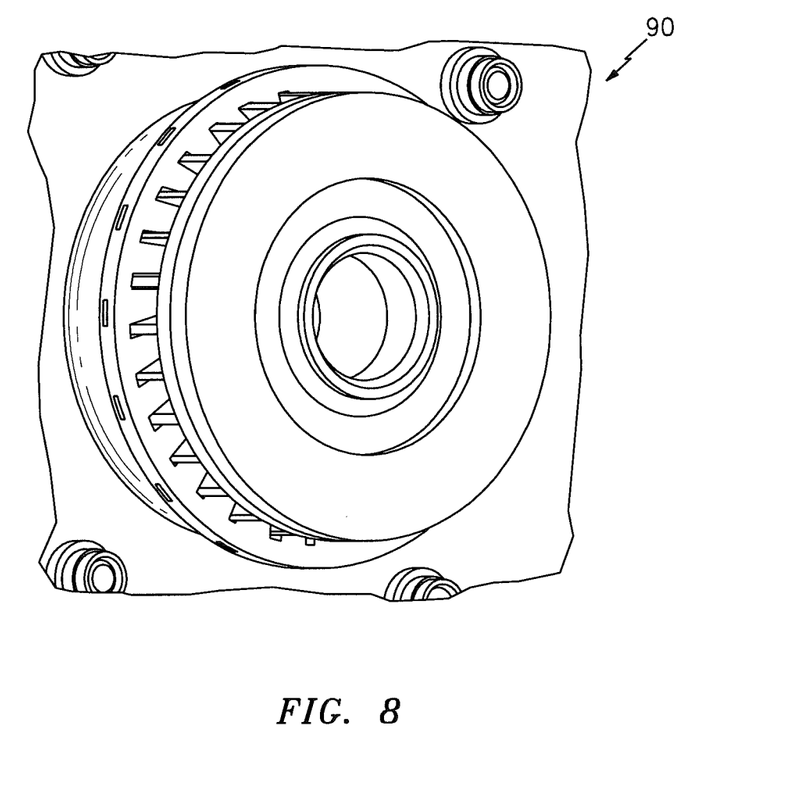
FIG. 8 is a rear perspective view of the swirler of FIG. 5.
Figure 9:
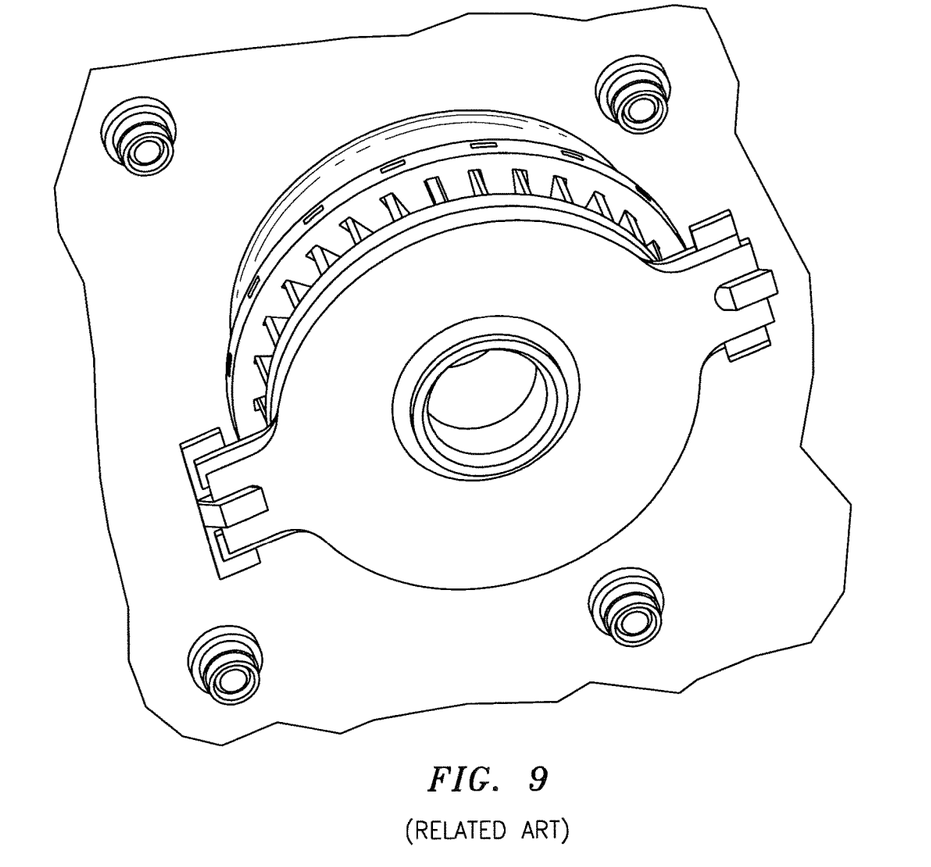
FIG. 9 is a rear perspective view of a conventional RELATED ART tanged swirler.
Figure 10:
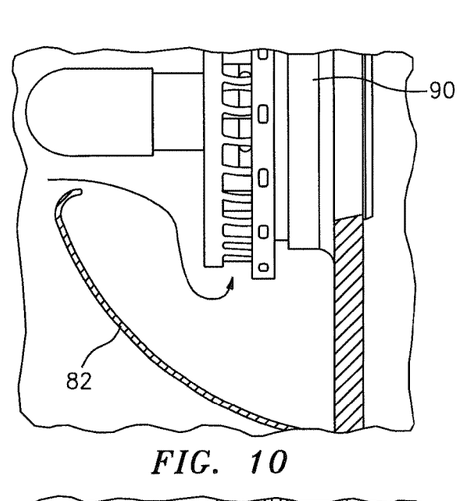
FIG. 10 is a schematic flow diagram of an airflow into the swirler of FIG. 5 along line A-A in FIG. 7.
Figure 11:
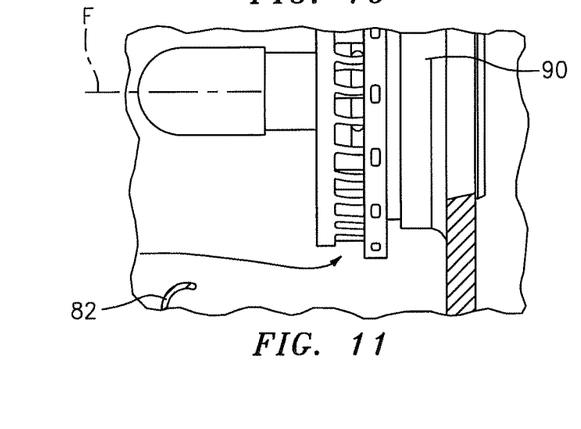
FIG. 11 is a schematic flow diagram of an airflow into the swirler of FIG. 5 along line B-B in FIG. 7.
Figure 12:
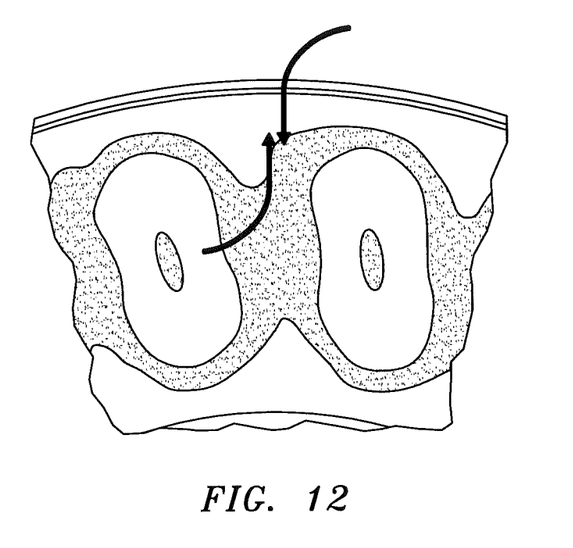
FIG. 12 is a schematic flow spectrograph of a fuel-air mixture from the swirler of FIG. 5.
Figure 13:
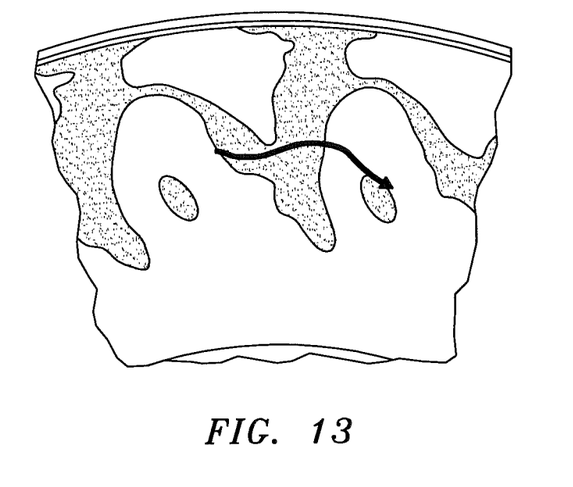
FIG. 13 is a schematic flow spectrograph of a fuel-air mixture from the RELATED ART swirler of FIG. 9.

With reference to FIG. 7, the uniform airflow into the swirler 90 (FIG. 8) facilitates fuel-air uniformity in contrast to the fuel-air mixture of a conventional non-circular swirler with, for example, with tangs (FIG. 9; RELATED ART). That is, the airflow from within the annular hood 82 enters normal to the swirler passages generally transverse to the fuel nozzle 86 (FIG. 10) and enters the swirler 90 at a shallow angle generally parallel to the fuel nozzle 86 (FIG. 11) to provide a uniform fuel-air mixture (FIG. 12) as compared to a tanged swirler (FIG. 13; RELATED ART).

Figure 14:
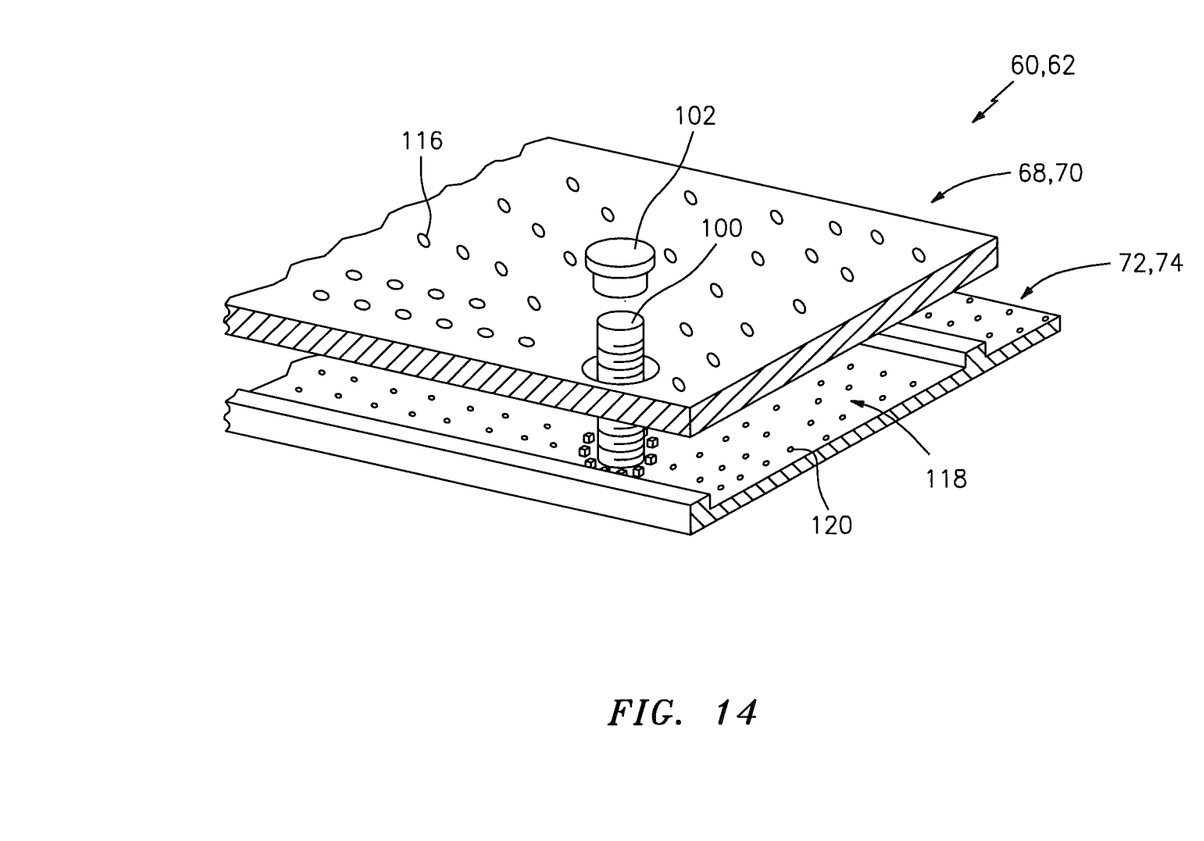
FIG. 14 is an expanded perspective partial sectional view of a liner assembly.

With reference to FIG. 14, a multiple of cooling impingement holes 116 penetrate through the support shells 68, 70 to allow air from the respective annular plenums 76, 78 to enter cavities 118 formed in the combustor liner assemblies 60, 62 between the respective support shells 68, 70 and heat shields 72, 74. The cooling impingement holes 116 may be generally normal to the surface of the heat shields 72, 74. The air in the cavities 118 provide backside impingement cooling of the heat shields 72, 74 that is generally defined herein as heat removal via internal convection.

A multiple of cooling film holes 120 penetrate through each of the heat shields 72, 74. The geometry of the film holes, e.g., diameter, shape, density, surface angle, incidence angle, etc., as well as the location of the holes with respect to the high temperature main flow also contributes effusion film cooling. The cooling film holes 120 are generally more numerous than the impingement holes 116 to promote the development of a film cooling along a hot side of the heat shields 72, 74. Film cooling as defined herein is the introduction of a relatively cooler airflow at one or more discrete locations along a surface exposed to a high temperature environment to protect that surface in the immediate region of the airflow injection as well as downstream thereof. The combination of impingement holes 116 and film holes 120 may be referred to as an Impingement Film Floatliner assembly.

Figure 15:
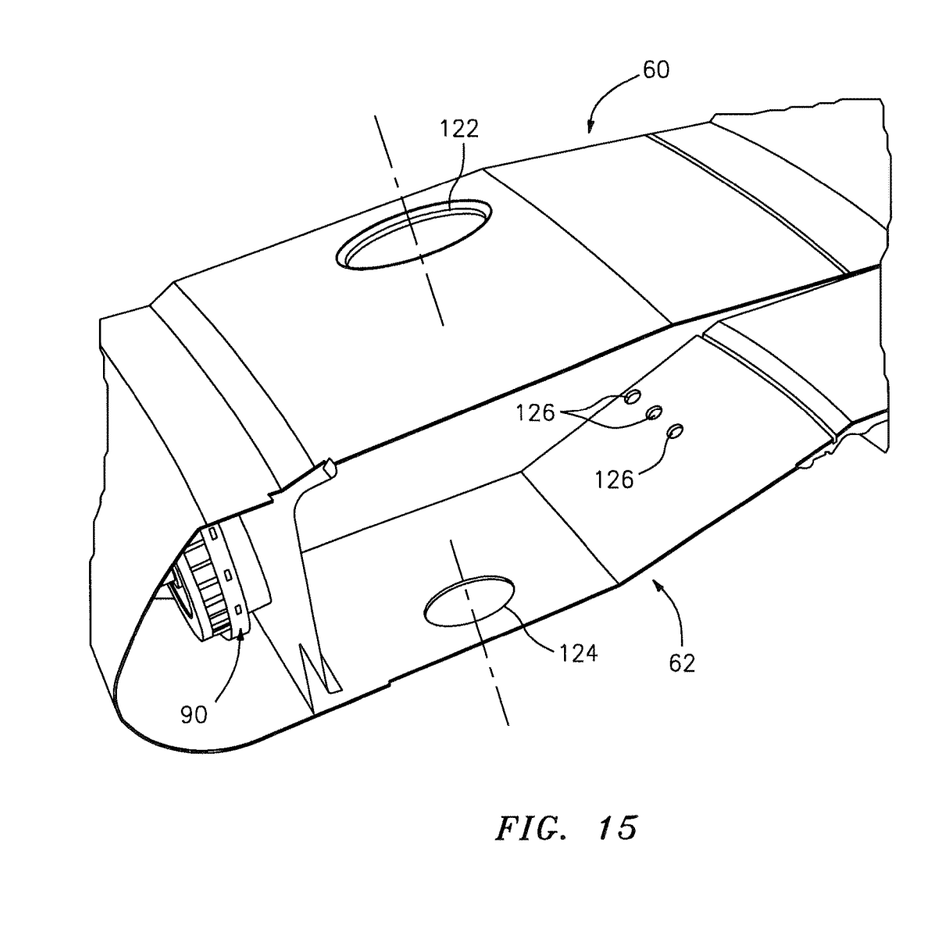
FIG. 15 is an expanded perspective partial sectional view of a combustor sector with trim holes according to one non-limiting embodiment.

With reference to FIG. 15, a quench hole 122, 124 penetrates the respective outer combustor liner assembly 60 and the inner combustor liner assembly 62 in each segment. For example only, in a Rich-Quench-Lean (R-Q-L) type combustor, the quench holes 122, 124 are located downstream of a respective fuel nozzle 86 to quench the hot combustion gases through the supply of cooling air into the combustor chamber 66. The quench hole 122 through the outer combustor liner assembly 60 and the quench hole 124 through the inner combustor liner assembly 62 are circumferentially offset but axially opposed.

A multiple of trim holes 126 are located through the inner combustor liner assembly 62 axially downstream of the quench hole 122. That is, the multiple of trim holes 126 are circumferentially offset from the quench hole 124 in the inner combustor liner assembly 62. The area of the multiple of trim holes 126 are subtracted in proportion to the quench holes 122, 124 such that the total mass quench airflow therethrough remains the same as prior to addition of the multiple of trim holes 126. In the disclosed non-limiting embodiment, three (3) trim holes 126 are located in each panel of the inner combustor liner assembly 62. That is, for each quench hole 124 there are three (3) trim holes 126 in the disclosed non-limiting embodiment.

Generally, the disclosed non-limiting embodiment, approximately 35% of the total airflow into the combustor section 26 enters the swirler 90; 25% is utilized for liner assembly cooling; 35% is utilized as quench flow; and 5% is trim flow. The quench hole 122 through the outer combustor liner assembly 60 and the quench hole 124 through the inner combustor liner assembly 62 provide a generally two-thirds/one-thirds flow split of the 35%.

Figure 16:
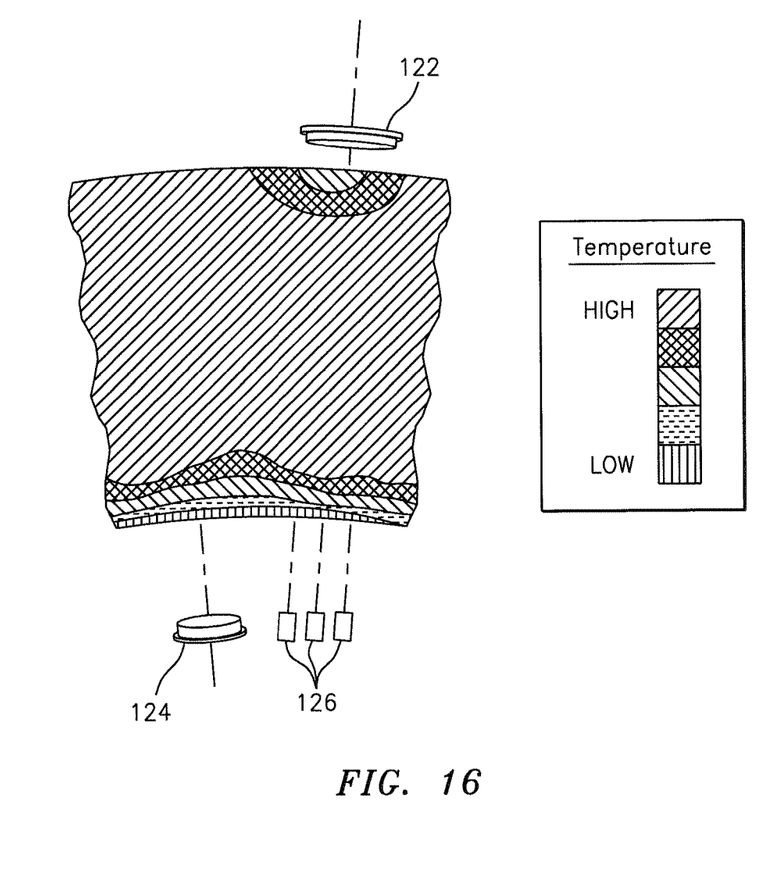
FIG. 16 is a thermograph of a combustor sector adjacent to the trim holes.

With reference to FIG. 16, the trim holes 126 are located near the combustor exit and NGVs 54A to tailor the radial temperature distribution factor, also known as the profile factor of the combustion gases. The overall spatial distribution of temperature within the combustor chamber 66 is referred to herein as the engine "pattern factor," which can be defined as the difference between maximum combustor temperature ($T_{max}$) and mean combustor exit temperature (T.sub.4) divided by the difference between the mean combustor exit temperature (T.sub.4) and the combustor inlet temperature (T.sub.3). Pattern Factor=[(T.sub.max−T.sub.4)/(T.sub.4−T.sub.3)]. That is, The Pattern Factor reflects the extent to which the maximum temperature deviates from the average temperature rise across the combustor, while the Profile Factor characterizes the extent to which the maximum circumferential mean temperature deviates from the average temperature rise across the combustor. In one example, the average exit temperature is 2,000° F. (1093° C.) with the maximum combustor temperature rise of 2,600° F. (1426° C.) which provides a pattern factor of approximately 0.3.

A low pattern factor facilitates a relative increase in service life and reduced fuel burn through reduced thermal effects upon the Blade Outer Air Seal (BOAS) and turbine blade creep in the downstream turbine section 54. That is, an increase in engine fuel-air ratio facilitates increased thrust yet acceptable combustion gas exit temperature distribution in the pattern factor and profile factor for turbine component operations and service life. A low pattern factor also facilitates usage of less cooling air to cool stationary turbine structures such as the 1st and 2nd vanes and blade outer air seals (BOAS). If airflow is reduced to maintain the same metal temperature, a lower fuel burn (TSFC) results for the same service life. If airflow is not reduced, the longer turbine service life results for the same fuel burn (TSFC).

The radial profile represents the average temperature at each radial location at the combustor exit. This temperature is what the rotating turbomachinery, such as the turbine blades experience. Generally, the radial profile needs to be cooler toward the inner radius to prevent 1st and 2nd blade creep. As the pattern factor is reduced and the exit temperature becomes more uniform, the radial profile typically becomes more uniform resulting in a hotter than desired temperature toward the inner radius.

The circumferentially uniform fuel/air mixture, facilitated by the swirler 90 that has uniform high swirl effectively interacts and mixes with quench zone 122 and 124 (FIG. 15) to produces a low pattern factor.

For operating conditions that are close to stoichiometric, the lower pattern factor produced by the swirler 90 and quench holes 122, 124 reduce the amount of temperature rise in the turbine section 28 from fuel rich streaks that may convert CO to CO2. Airflow from the quench holes 122, 124 is moved to the trim holes 126 in such a way to maintain an effective quench zone and low pattern factor while cooling the inner radius to acceptable levels. That is, the trim holes 126 tailor the radial profile of the combustor gas flow to achieve desired results.

The swirler 90 and the trim holes 126 facilitate an increase in engine fuel-air ratio facilitates increased thrust yet prevents secondary heat release in the turbine section 28. Airflow that feeds the swirler 90 is more uniformly distributed through the removal of non-uniform mount features that increase swirler interaction with the quench zone and improve fuel uniformity to create a relatively low pattern factor on the order of less than 0.3 and a radial profile factor of approximately 0.1. The radial temperature profile is then readily adjusted with the arrays of trim holes 126.

Figure 17:
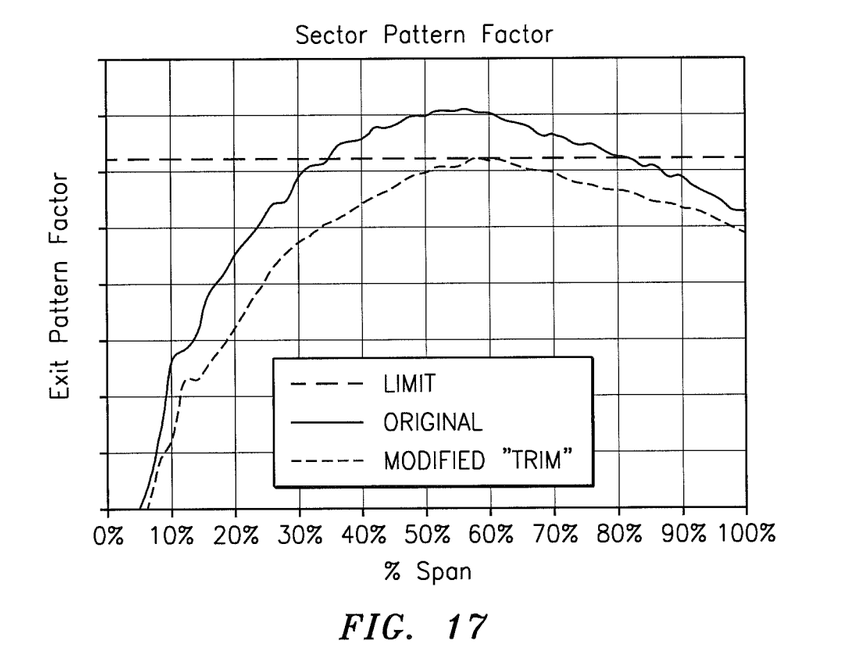
FIG. 17 is a graphical representation of a pattern factor for a combustor according the disclosure.
Figure 18:
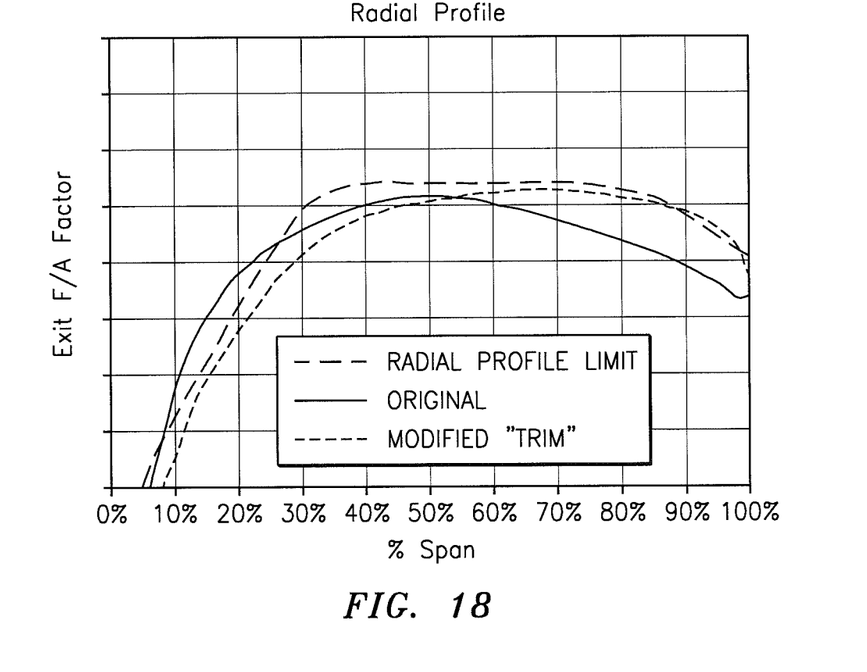
FIG. 18 is a graphical representation of a radial profile factor for a combustor according the disclosure.

With reference to FIGS. 17 and 18, the lower pattern factor produced by the swirler 90 meets the desired target limit but, without the trim holes 126, the radial profile is too hot towards the inner span (FIG. 18). The trim holes 126 thereby further tailor the radial profile in the desired region to, for example, facilitate a reduction in turbine blade "creep". For example, the trim holes 126 may be located and sized to trade-off a fuel-air factor reduction in the 5%-25% span region for a slight increase in the 55%-100% span region.

It should be understood that various other trade-offs and tailoring may alternatively or additionally be provided so as to form a desired profile. Typically, a "too flat" profile is undesirable as cooling airflow may be more specifically controlled in the mid-span regions of the turbine blades and vanes in the turbine section 28. That is, cooling passages may be readily refined in the mid-span regions rather than in the blade root regions.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor of a gas turbine engine comprising:
a first liner assembly with a first quench hole and a multiple of trim holes downstream thereof; and
a second liner assembly opposed to the first liner assembly and radially outboard of the first liner assembly, the second liner assembly including a second quench hole,
wherein the second and first quench holes are configured to split a quench flow in a ratio that is generally two-thirds to one-third, respectively, and
wherein said multiple of trim holes are axially aligned with said second quench hole, and
wherein the first liner assembly and the second liner assembly are configured to obtain a pattern factor on the order of less than 0.3 and a radial profile factor of approximately 0.1.

* * * * *